March 5, 1968  T. F. ARONSON  3,371,461
METHOD AND APPARATUS FOR CHARGING A PACKET OR
CONTAINER WITH A FLOWABLE MATERIAL
Filed Oct. 15, 1964  9 Sheets-Sheet 1

INVENTOR.
THEODORE F. ARONSON
BY
Irving Seidman
ATTORNEY

Fig. 2

$V_0 > V_1 \quad V_1 = V_2$

March 5, 1968 T. F. ARONSON 3,371,461
METHOD AND APPARATUS FOR CHARGING A PACKET OR
CONTAINER WITH A FLOWABLE MATERIAL
Filed Oct. 15, 1964 9 Sheets-Sheet 3

INVENTOR.
THEODORE F. ARONSON
BY
ATTORNEY

March 5, 1968  T. F. ARONSON  3,371,461
METHOD AND APPARATUS FOR CHARGING A PACKET OR
CONTAINER WITH A FLOWABLE MATERIAL
Filed Oct. 15, 1964  9 Sheets-Sheet 5

INVENTOR.
THEODORE F. ARONSON
BY
*Irving Seidman*
ATTORNEY.

March 5, 1968   T. F. ARONSON   3,371,461
METHOD AND APPARATUS FOR CHARGING A PACKET OR
CONTAINER WITH A FLOWABLE MATERIAL
Filed Oct. 15, 1964   9 Sheets-Sheet 6

INVENTOR.
THEODORE F. ARONSON
BY
Irving Seidman
ATTORNEY

March 5, 1968  T. F. ARONSON  3,371,461
METHOD AND APPARATUS FOR CHARGING A PACKET OR
CONTAINER WITH A FLOWABLE MATERIAL
Filed Oct. 15, 1964  9 Sheets-Sheet 7

INVENTOR.
THEODORE F. ARONSON
BY
Irving Seidman
ATTORNEY.

March 5, 1968 T. F. ARONSON 3,371,461
METHOD AND APPARATUS FOR CHARGING A PACKET OR
CONTAINER WITH A FLOWABLE MATERIAL
Filed Oct. 15, 1964

INVENTOR.
THEODORE F. ARONSON
BY
Irving Seidman
ATTORNEY

… … …

United States Patent Office 3,371,461
Patented Mar. 5, 1968

3,371,461
METHOD AND APPARATUS FOR CHARGING A PACKET OR CONTAINER WITH A FLOWABLE MATERIAL
Theodore F. Aronson, 60 Crescent Road, Glen Cove, N.Y. 11542
Filed Oct. 15, 1964, Ser. No. 404,082
21 Claims. (Cl. 53—28)

This invention relates in general to a method and apparatus for measuring and packaging a flowable material.

One form of the invention is specifically directed to a method and apparatus for continuously forming a packet from readily foldable sheet material and accurately charging the packet so formed with equal predetermined amounts of flowable material at relatively high operational speeds. In another form, the invention is specifically directed to a method and apparatus for continuously charging a fluid material in preformed containers.

Heretofore, the known methods and apparatuses for packaging predetermined amounts of flowable material, as for example, powders and granulated materials, like talcums, face powders, sugar, various flowable drug products, etc., in pouch type packets, were relatively slow for the reason that intermittent operation was required. This was due primarily to the difficulty encountered in filling the pouch of such packets with such flowable material. In order that the pouches of such packets be filled with a flowable material by the known methods and apparatuses, it was heretofore necessary to pause the moving line of such packets at the filling station in order to permit time for the flowable material to flow from its source of supply to the pouch of the respective packets brought thereto. Because such packets are formed of a flexible foldable sheet material which is readily subjected to tearing, extreme difficulty has also been encountered in opening and aligning the opening of the packet at the filling station for assuring proper flow of the material thereinto so that accuracy of the amount of material placed in the respective packet could be maintained. For these reasons, the known methods and apparatuses were generally incapable of attaining the desired accurate high speed operation desired to reduce operational costs to a minimum.

In filling a fluent material in a rigid preformed container, such as a jar, glass, can and the like, defficulty has been encountered in filling and compacting the predetermined amount of material thereinto in a rapid, continuous manner.

An object of this invention is to provide a method and apparatus for greatly increasing the speed and accuracy with which pouch type packets are formed and filled with a flowable material over that of the known methods and apparatuses.

It is another object of this invention to provide a method and apparatus in which the packets for containing a predetermined charge of flowable material are formed and filled in a continuous and uninterrupted manner at extremely high speeds.

Another object of this invention is to provide a method and apparatus in which equal predetermined amounts of flowable material can be accurately placed in the pouch of a packet as the packets are successively made and continuously moved through a filling station.

Still another object is to provide a method and apparatus in which the placing of the charge of flowable material in the pouch of an individual packet is greatly enhanced by continuously forming the pouches of successive packets directly about the discharge end of a respective funnelling means which directs the predetermined charge to its associated pouch.

Still another object is to provide a method and apparatus for forming the respective pouches of successive packets directly about the discharge end of a moving line of funnelling means in a manner so that the relative linear speed between the respective funnelling means and its associated packet is zero as the same passes through the filling station.

Still another object is to provide for the continuous sealing and severing of the pouches of the connected packets in a manner to maintain the entire operation continuous.

Still another object of this invention is to provide a method and apparatus in which the packets for containing a flowable material are successively formed from a continuous strip of material into a series of connected packets and wherein the packets so formed are subsequently filled with a predetermined charge of flowable material, the packets being then sealed and severed in a continuous and uninterrupted manner.

Still another object is to provide a method and apparatus for continuously forming and filling pouch type packets that is relatively simple, economical and positive in operation.

Another object is to provide a method and apparatus for continuously filling preformed jars or containers with a fluent material.

The foregoing objects and other features and advantages of this invention are attained in one form of the invention by the method comprising the steps of continuously folding a strip of material along a longitudinally extending foldline to define a reversely folded web. A line of successive and continuously moving funnelling means traveling at substantially the same rate as that at which the folded web is being advanced is positioned so that the moving funnelling means have their respective discharge ends disposed between the folds of the web. As the funnelling means and the folded web enclosing the discharge end thereof are continuously advanced at relatively zero speed therebetween toward the filling station, the opposed folds of the web are joined at spaced intervals to form a series of transversely extending seams between the adjacent funnelling means to define a series of connected open end pouches, each of which is formed directly about the discharge end of an associated funnelling means. The respective moving funnelling means and its associated moving pouch are then successively charged with equal predetermined amounts of flowable material from a suitable source of supply without interruption of the moving line of funnelling means. As the flowable material received by the respective funnelling means has emptied into its respective pouch, the funnelling means is removed therefrom. Upon removal of the funnelling means, the opened ends of the respective pouches are then successively sealed or closed to confine the flowable material therein. The respective sealed pouches are then successively severed along a line disposed intermediate the width of the transverse seam by which the adjacent packets are joined whereafter the severed packets are then collected or stacked in an orderly manner. If desired, upon stacking of the pouches, certain of the packets may be displaced at regular intervals so that the same may be readily counted at a glance.

An apparatus for automatically performing the described method comprises a frame having disposed thereon a folding station. Means are provided for continuously feeding an elongated strip of material from a suitable source of supply through the folding station wherein the material is continuously folded along a longitudinally extending fold line to define a reversely folded web as the same is moved through the folding station. Spaced from the folding station is a filling station from which the flowable material for charging the packets formed of web material is supplied.

The filling station comprises a hopper for containing a supply of flowable material, and an associated rotating turret filling head means which is provided with one or more measuring chambers that rotate between a filling position and a discharging position. In accordance with this invention, a conveyor means traveling in an endless path and carrying thereon a series of connected funnelling means is particularly arranged with respect to the folding station so that several of the respective discharge ends of the connected funnelling means are successively disposed in a line between the folds of the folded web at a position downstream of the filling station, i.e. between the folding station and the filling station. The arrangement is such that the relative speed of the conveyor carrying the funnelling means and that of the folded web toward the filling station is zero. Means are provided in advance of the filling station for securing the folds of the web at spaced intervals to form a series of transversely spaced seams to define therebetween a series of connected pouches which are formed directly about the respective discharge ends of each of the funnelling means. The successive funnelling means and the pouches or packets directly formed about the respective discharge ends thereof are successively moved through the discharging position of the turret filling head. In accordance with this invention, the turret filling head is moved with an angular velocity that is synchronized with or rendered substantially equal to the linear speed of the moving funnelling means and the associated packet. In this manner the measuring chambers of the filling head turret are successively discharged and the respective charge thereof is deposited into the respective funnelling means passing thereunder in an uninterrupted manner. The respective funnelling means and its associated pouch without interruption then travels beyond the filling station for a distance and time sufficient for the charge of flowable material deposited into the funnelling means to be emptied into its associated pouch. At this point, the funnelling conveyor is arranged so that its direction of travel is changed so that the respective funnels are successively removed from their associated pouches. In another form of the invention, the respective funnel means are removed by gradually withdrawing the discharge ends of the funnels from the packet. This is attained by inclining the moving line of funnelling relative to the moving line of packets.

Means are thereafter provided for successively sealing the opposed folds of the web along the open end of the packet so as to tightly seal the flowable material therein. The sealed packets are then successively severed by a cutting means constructed and arranged to separate the end-most packet from the moving line of connected packets along a cut line disposed intermediate the width of the transverse seam or seal formed between adjacent connected packets. Means in the form of a slipping clutch is provided for receiving and ejecting the severed packets whereby the same are subsequently collected.

If desired, means may be associated at the end of the apparatus to provide for the orderly stacking and counting of the packets immediately upon the severance of the same from the continuous web of connected packets.

In another form of the invention the method and apparatus has been modified to accommodate the continuous filling and packing of a fluent or powder substance into a preformed container, such as a jar or can. In this form of the invention the endless line of connected funnelling means are conveyed so as to pass in front of or in back of the hopper of the filling station to thereby reduce the overall height in the travel thereof. Also, the respective funnelling means are specifically constructed for enhancing the compacting of the fluent substance within each of the containers. Accordingly the respective funnel means in the endless line thereof include an inner and outer, concentrically disposed funnel spaced one from the other to define an air evacuation chamber therebetween. The arrangement is such that the containers are successively conveyed through the filling station in unison with the moving line connected funnelling means. The respective containers are moved so that they are successively elevated or raised as they approach the filling station to form a fluid tight seal with the discharge end of the outer funnel prior to moving through the filling station. To provide for uninterrupted filling and compacting of the fluent material within the respective containers, the linear speed of the moving funnels and associated containers equal substantially the tangential velocity of the filling head at the filling station. Means are also provided for vibrating the inner funnel to shake down the material received therein as it passes through and beyond the filling station. Accordingly the air displaced by the material flowing into the container is exhausted through the space between funnel means. In this manner compacting of the material within the container is assured.

A feature of the instant invention resides in the provision of continuously folding a web with a reverse fold and positioning therebetween the discharge end of a funnelling means so that the successive connected packets are formed directly about the discharge ends of the individual funnelling means.

Another feature of this invention resides in the provision of forming the individual packets directly about the discharge end of the respective funnelling means prior to the passing of the same through a filling station so that the funnelling means and the associated packet formed thereon are passed through a filling station at a relative velocity of zero therebetween.

Another feature of this invention resides in the provision of arranging for the endless travel of funnel conveying means whereby the same can be readily disposed in a continuous and uninterrupted manner between the opposed folds of a web so that the latter can be formed into a series of connected pouches directly about the discharge ends of the respective funnelling means.

Another feature of this invention resides in the provision of utilizing a rotary turret filling head in cooperation with a rapidly moving linear line of connected packets for continuously and successively charging the same with accurate predetermined equal amounts of flowable material.

Another feature resides in the provision of synchronizing the angular velocity of the rotary filling head with the linear velocity of the moving line of connected packets and associated funnel means through the filling station so that the relative velocity therebetween is zero.

Another feature resides in the provision of means whereby the respective sealed end packets can be continuously and cleanly severed from the line of preceding connected packets.

Another feature resides in the provision of means for effecting the orderly stacking and counting of the severed packets.

Still another feature resides in means for assuring positive and proper sealing of a continuous web into a series of connected packets without adversely effecting the maximum optimum speed of the desired operation.

Another feature resides in the provision of utilizing vibrating funnelling means with provision for evacuating the air displaced by the fluent material charging into a container for enhancing the compacting of the material therein.

Other features and advantages will become more readily apparent when considered in view of the drawings and description in which.

In accordance with this invention, the method of continuously forming and charging a pliable packet with a flowable material, as for example, a powder, a crystalline or a granular material, such as sugar, face powder, various powdered drug substances or the like, and in some instance, even a liquid material, comprises the steps of taking a strip of readily foldable material, as for example, a ribbon or sheet of paper, foil or plastic, and continuously folding the same along a longitudinally extending foldline to define a web having reverse folds. A series of spaced apart funnelling means are then successively disposed between the reverse folds of the web. The reverse folds of the web are then sealed together at transversely spaced intervals along a seal line disposed between adjacent funnel means. In this manner a plurality of successively connected pouches are directly formed about the respective funnelling means. Accordingly each packet is closed at the bottom thereof by the reverse fold of the web, and along the opposed sides thereof by transversely spaced seams or seals. Accordingly, the respective connected packets with the respective discharge end of the funnelling means already in position therein are simultaneously advanced toward a filling station with a substantially zero relative velocity therebetween.

With the web formed into pouches or packets directly about the respective discharge ends of the funnelling means, a charge of flowable material is then successively deposited in each of the funnelling means as the packet is continuously moved through a filling station. After the flowable material has emptied into its respective pouch from the respective funnelling means associated therewith, the funnelling means is removed from the pouch and the opposed folds along the open end of the pouch are then secured by forming a seal therealong. Also the packet may be paddled to enhance the settling of the material therein. The successive packets are then successively sealed after the removal of the funnel therefrom. The packets are then severed by cutting the same along a cutting line located intermediate the width of the transverse seam or seal formed between the adjacent connected packets. After severing, the packets are then stacked and/or counted, if desired.

Figure 1:
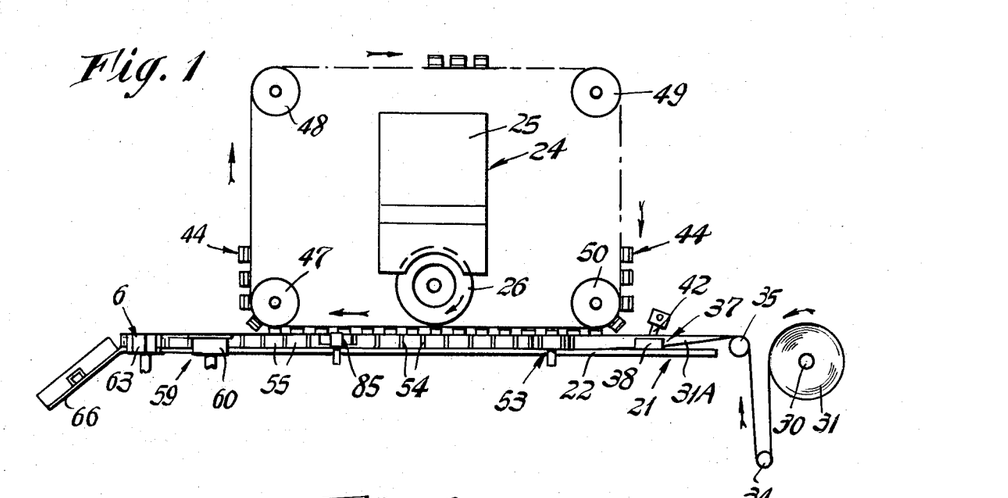
FIGURE 1 is a diagrammatical sketch of the apparatus illustrating the cooperative relationship of the fundamental component parts thereof.
Figure 2:
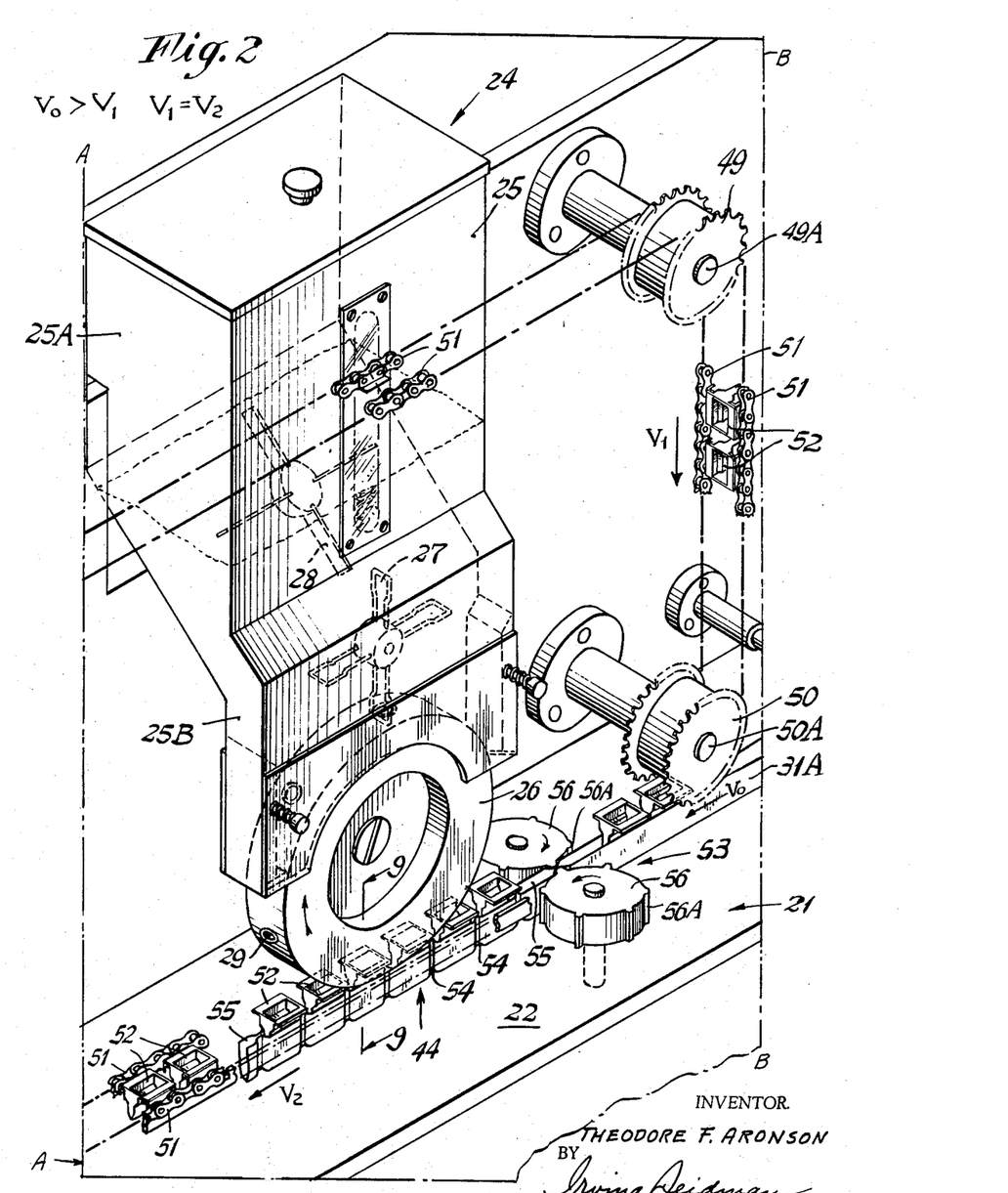
FIGURE 2 is an enlarged perspective view of the filling station portion of the instant invention.

Referring to the drawings, there is shown a preferred embodiment of an apparatus by which the above method can be automatically performed. As shown, the apparatus comprised essentially of a machine frame 21 that includes a table portion 22 and a connected back support 23 disposed normal thereto. Intermediate the ends of the frame 21 and supported on the back support 23 is a filling station 24. It comprises essentially of a hopper 25 for containing a supply of flowable material, as for example, sugar, talcum and the like, and an associated rotated turret filling head 26. As shown in FIG. 2, the hopper 25 comprises an enlarged upper end portion 25A to which there is connected a laterally offset lower end portion 25B of reduced cross sectional area. If desired, suitable agitating means, as for example, a rotating paddle type wheel or vane 27, 28, may be disposed within the hopper 25 to maintain the material therein in a readily flowable state.

The rotating turret filling head 26 associated with the hopper 25 may be of the type described and disclosed in U.S. Patent No. 2,540,059. Essentially it comprises of a rotatably mounted wheel which has formed therein one or more measuring chambers 29 for receiving therein an accurate predetermined measured amounts of flowable material as the respective measuring chambers 29 are brought into communication with the material within the hopper. The arrangement of the turret 26 is such that the respective measuring chambers 29 are rotated between a filling position, as for example, when a measuring chamber 29 is disposed at the top of the wheel, and a discharging position, as for example, when the chamber 29 is rotated approximately 180° clockwise relative thereto. Accordingly, the respective measuring chambers 29 of the turret head 26 are successively filled and discharged as the turret head is rotated, as described in U.S. Patent No. 2,540,059. As the specific details of the turret head do not form a part of the instant invention, a further detailed description thereof is not deemed essential for one skilled in the art to understand the instant invention.

Adjacent one end of the frame there is provided a spool 30 which is adapted to receive a roll or supply of web material 31 from which the packets are formed. The web material 31 may comprise a strip of any suitable material which is impervious to the flowable material to be placed therein, and may be formed of paper, plastic, metallic foil and the like. Operatively associated with the spool 30 for supporting the supply of material 31 is an arm 32 which is pivotally mounted to the frame at one end about a pivot 33 and which has connected to its other end a roller 34 about which the strip of material 31 is threaded so as to define a tension loop therein. Suitable spring means (not shown) are provided to bias the arm 32 so as to maintain the strip of material looped thereon taut and free of any slack which may be formed as it is being fed to the cooperating feed rollers 35 and 36 which in turn feed the strip of material to the folding station 37.

Figure 3:
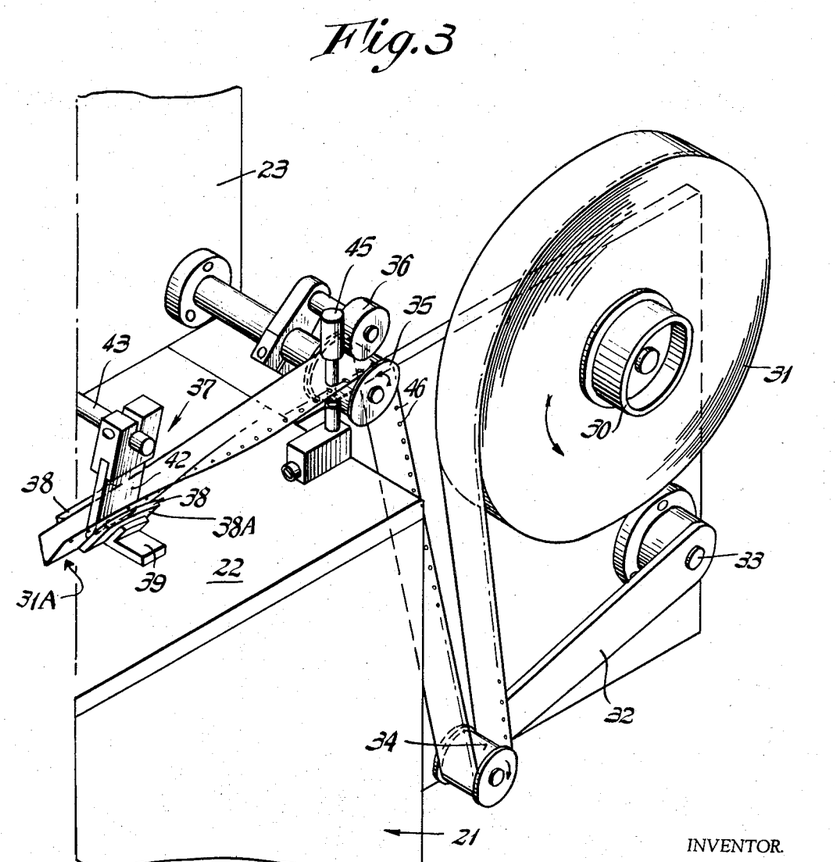
FIGURE 3 is an enlarged perspective view of the right end portion of the apparatus extending to the right of line B—B on FIG. 2 to illustrate the folding station thereof.

As shown in FIG. 3 the folding station 37 comprises a pair of spaced plate members 38, 38, which are maintained in spaced relationship on the table surface of the frame by means of an angled bracket 39. While not shown, if desired, the angled bracket 39 may be provided with a slotted opening in the horizontal leg portion thereof to render the distance between plates 38, 38 of the folding station 37 adjustable by providing for sliding the bracket relative to an anchoring bolt. The leading upper corners 38A of the spaced plates 38, 38 are laterally bent outwardly to define an enlarged mouth opening through which the web 31A of the material is first fed, the plates 38, 38 being formed so that the spacing therebetween is gradually reduced toward the outlet end thereof. Between the folding plates 38, 38, there is disposed a mandrill 42 about which the web 31A is reversely folded as the web is fed through the folding station 37. Accordingly, the mandrill 42 is supported by means of a rod 43 extending outwardly from the vertical support 23.

In accordance with this invention, both the feed roller 35 and the spool 30 of the supply roll 31 are suitably driven off the main drive shaft (not shown) of the machine by any suitable gear drive means as may be well known to those skilled in the art. In this manner, the danger of tearing or otherwise damaging the strip of material 31A as it is fed is greatly minimized.

If desired, means in the form of an electric eye 45 may be disposed adjacent the feed roller 35 to insure proper registration of the strip 31A during the operation of the machine. This may be attained by providing the rolled strip of material with perforations 46 along an edge portion thereof to effect such registration.

Figure 10:
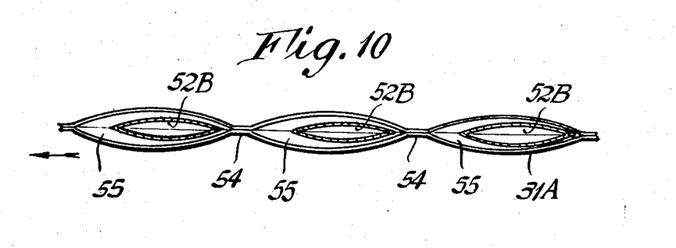
FIGURE 10 illustrates a detail plan view of the packets formed about the discharge end of the funnel means in accordance with this invention.

A funnel conveying means 44 is provided and it is arranged to travel in an endless path. As shown, a plurality of rectangularly disposed sprocket means 47, 48, 49 and 50 are rotatably journalled about suitable spindles 47A, 48A, 49A and 50A projecting outwardly from the machine's back support 23. As shown, each of the sprocket means comprises a connected double sprocket about which a pair of parallel endless chains 51, 51 are threaded. Connected between the spaced parallel chains 51, 51 are a plurality of funnelling means 52. Each of the funnelling means comprises a receiver which has a substantially enlarged rectangular inlet portion 52A that converges downwardly into a rectangularly shaped depending outlet portion 52B of substantially reduced cross section. Accordingly, one of the sprockets 50 is suitably connected in driving relationship with the main drive shaft (not shown) of the machine and it thus forms the driving sprocket for the funnel conveyor 44. The other three sprockets about which the conveyor chains 51, 51 are threaded function merely as idlers and guides for changing the direction of travel of the conveyor 44. The arrangement of the conveyor 44 is such that its lower flight portion is arranged to travel in a line immediately adjacent and below the filling head turret 26 so that the respective inlet portion 52A thereof can be disposed closely adjacent to the point at which the respective measuring chambers 29 discharges its measured amount of material. The conveyor 44 is further arranged so that when the funnels 52 make a turn about the sprockets 50, 50, the respective funnels are successively positioned so as to have the discharge end portions 52B thereof disposed between the folds of the folded web so that the respective funnels travel with the web to and through the filling station 24. The arrangement of the apparatus is such that the relative speed between that of the funnel means and that of the folded web 31 toward the filling station is zero. As best seen in FIG. 10, the discharge ends 52B of the respective funnels are situated so as to be close to the trailing edge of the respective packets so as to provide clearance for the funnel means as latter is removed as it rotates about sprocket 47.

Located on the table between the folding station 37 and the filling station 24 are means 53 for sealing the folds of the web 31A at transversely spaced intervals between successive funnels. As shown, the sealing means forming the side seals 54 whereby the reverse folds of the material 31A are defined by a series of connected pouches 55 comprised essentially of a pair of cooperating counter-rotating rollers 56, 56, one of which is disposed on each side of the folded web. The respective rollers 56, 56 have formed thereon a series of spaced radially projecting sealing bars 56A, formed on the periphery thereof. The arrangement is such that as the respective sealing rollers 56, 56 are rotated the cooperating sealing bars 56A thereof are brought in cooperating bearing relationship on opposed sides of the web so as to impart a pressure thereon to form a seal. The seal thus formed secures the folds of the web at transversely spaced intervals to define packets or pouches 55. The arrangement and timing of the sealing means 53 is such that the seams 54 are formed between adjacent funnel means 52. In this manner, the cooperating side sealing means 53 form a series of connected pouches or packets 55 directly about the respective discharge ends 52B of the successive funnelling means. If the web is formed of a heat fusible material, as for example, a plastic, sealing bars may be heated so that a fusion seal may be formed.

The funnel means with the associated pouches 55 formed directly thereto are thus arranged so that they are simultaneously moved through the filling station, the sealing bars 56A of the sealing means 53 cooperating to assist the feeding of the web therethrough.

Figure 13:
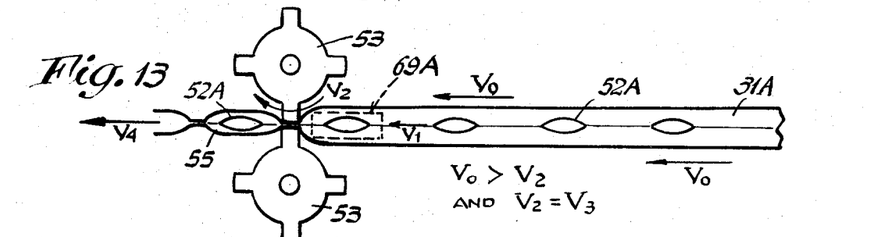
FIGURE 13 is a diagrammatic plan showing of the relative speed the folded web and the sealing means forming the packet about the discharge ends of the funnel.
Figure 14:
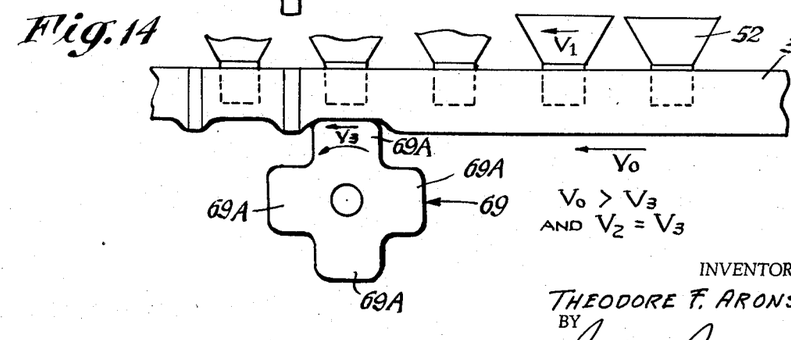
FIGURE 14 is a side elevation view of FIG. 13 to illustrate the slowing down of the forward motion of the folded web as the packets are formed on the funnels.

To effect efficient continuous movement of the web 31A and funnel means 52 toward the filling station 24 means are provided for slightly slowing down the forward motion of the folded web 31A prior to forming the pouches or packets 55 on the funnels 52. As shown in FIGS. 13 and 14, the folded web 31A prior to the formation of the pouches 55 is shown as having a velocity $V_0$. The funnelling means 52 are timed to have a velocity $V_1$ which is slightly less than the velocity $V_0$ of the web. Therefore, to absorb the difference in velocities $V_0$ of the web and $V_1$ of the funnels so that each may simultaneously move through the filling station with an equal velocity of $V_4$, a patter or push up means 69 is provided for pushing up the bottom of the packet 55 along the fold thereof. As best seen in FIG. 14, the patter or push up means 69 comprises a rotating cruciform shaped member in which the width of the respective arm portions 69A thereof equal to substantially the width of the individual pouches 55. Accordingly, the arms 69A of the patter means 69 travel at a velocity $V_3$ which is equal to the velocity $V_1$ of the funnel means 52. The physical relationship of the patter means 69 with respect to the side seal means 53 is such that the patter means 69 effect the push up of the web 31A before the side seals 53 are formed to absorb the differential velocity between $V_0$ of the web and $V_1$ of the funnel. After the push up of the bottom of the folded web is affected the side seals are formed. The velocity of the seal means 53 forming the side seals are timed to equal the velocity of both the funnel $V_1$ and the pusher means $V_3$. Thus $V_0$ is made slightly greater than $V_1$; and $V_1$ is equal to $V_2$, which is equal to $V_3$ which is equal to $V_4$, the final velocity of both the web and the packet 55 through the filling station.

Figure 12:
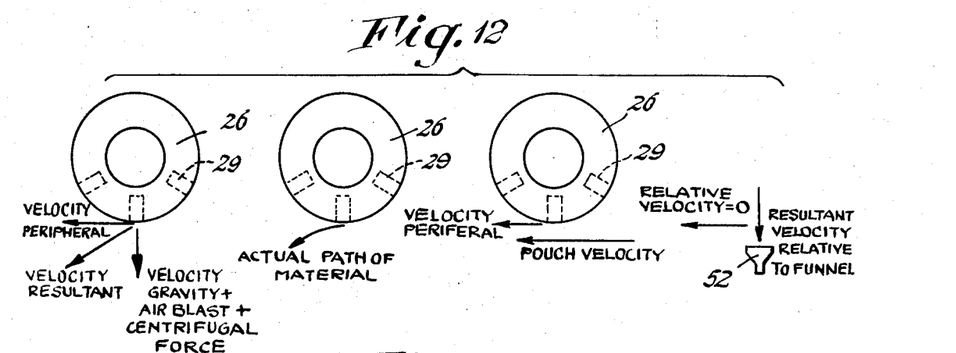
FIGURE 12 is a diagrammatic illustration of the relative velocity relationship between the moving line of connected packet and the angular velocity of the rotating filling head.

The rotation or angular velocity of the turret filling head 26 in turn is synchronized or timed to the final linear velocity $V_4$ of the pouches 55 and its respective funnelling means which are carried by the conveyor chain 51, 51 so that the respective measuring chambers 29 can be successively emptied into succeeding moving funnel means respectively without interruption as the latter pass through the filling station. FIG. 12 illustrates the relative velocities of the rotating head 26 and the funnelling means moving thereby.

The direction of the lower flight portion of the funnels and their respective associated pouches is maintained for a distance and a time sufficient to insure that all of the flowable material received in respective funnels 52 has passed therethrough and emptied into its associated pouch 55. At this point, the respective funnel means 52 are successively removed from their individual pouches 55 by the change in the direction of the conveyor chain 51, 51 as it rounds sprocket 47. To provide sufficient room for clearing the ends of the funnel from the associated pouch, the funnels are initially disposed adjacent the trailing seal of the pouch as shown in FIG. 10.

Figure 15:
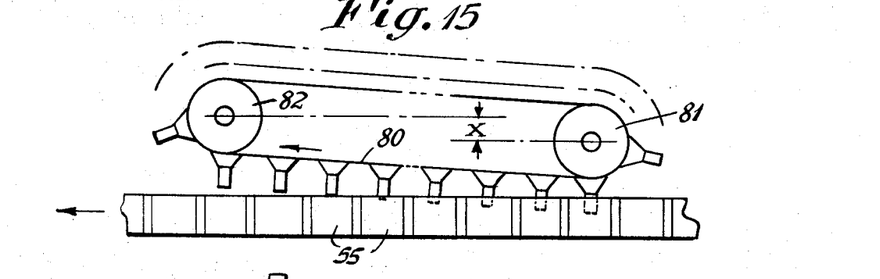
FIGURE 15 illustrates a modified manner of removing the discharge ends of the funnel means from the packet upon filling of the same.

FIG. 15 shows a slightly modified form of the invention to illustrate another manner in which the funnels 52 may be removed from the packets 55 formed thereon. In this form of the invention the conveyor means or chains 80 of the successive funnels 52 are threaded over a pair of opposed sprockets 81, 82, the respective sprocket rotating about axes which are vertically spaced. Thus the moving line of funnels 52 is inclined upwardly with respect to the moving line of pouches 55 formed thereon. Accordingly, the vertical distance X between the axes of the respective sprockets 81, 82 is equal to at least the distance which the respective funnels 52 project into the associated packets 55. Thus the inclined path of the moving funnels 52 enables the funnels to be progressively withdrawn from the associated pouches 55, as the latter are moved linearly beyond the filling station.

Figure 4:
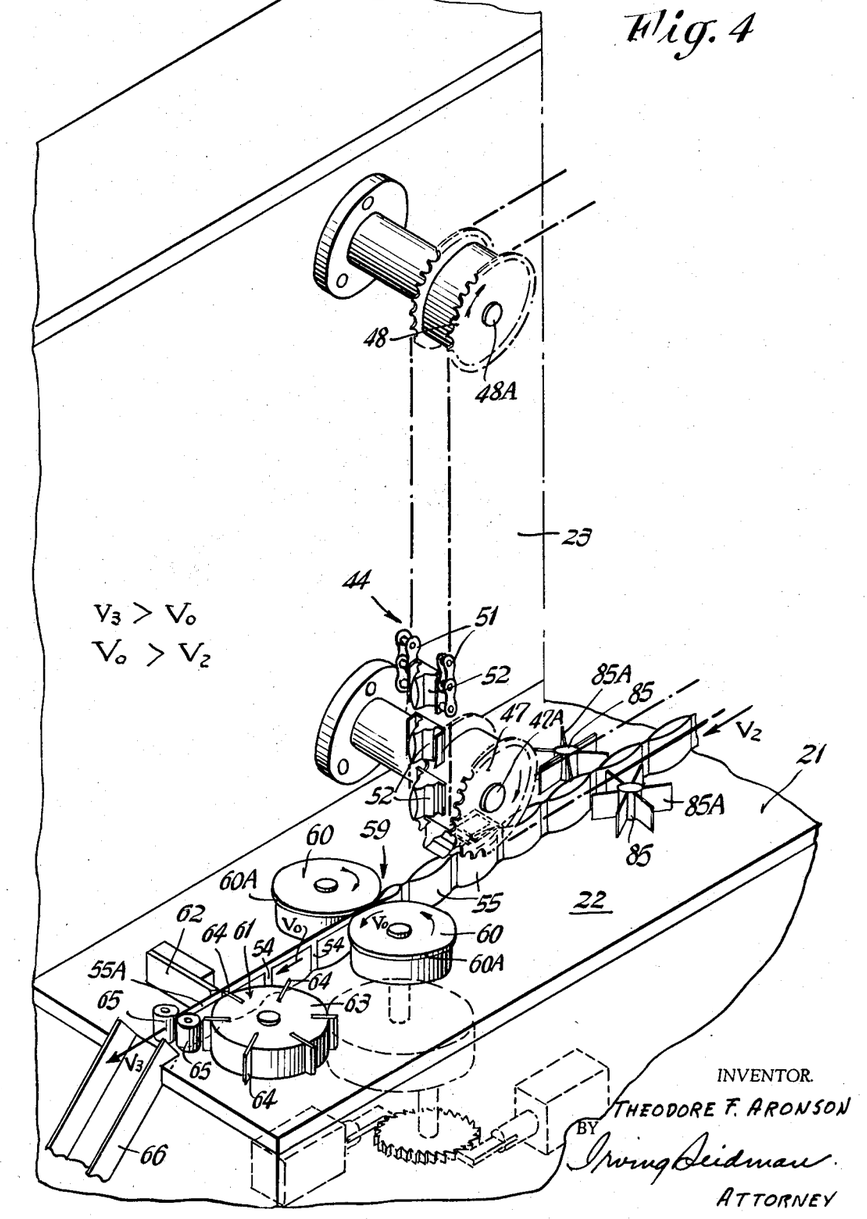
FIGURE 4 is an enlarged perspective view of the left end portion of the apparatus extending to the left of line A—A on FIG. 2, illustrating the sealing and severing of the filled packets.

Immediately downstream of the sprocket 47 there is disposed a second sealing means 60 for securing the folds of the web to form a seal along the top opening of the pouch after the funnels have been removed to assure a completely sealed packet for the flowable material. As shown in FIG. 4, the cooperating sealing means 59 to close the packet 55 comprises a pair of cooperating rollers 60, 60 each of which is provided with a laterally extending or projecting flange portion 60A adjacent the upper end thereof and each of which is disposed on opposite sides of the web. The width of the respective flanges 60A is substantially equal to the width of the top seal to be formed thereby. Accordingly the rolling engagement of the sealing rollers 60 with the web 31A in forming the top seal of the packet assist the advancing or feeding of the connected packets 55 through the filling station. Accordingly, as the packets are being fed between the cooperating flanges 60A of the top sealing means, the pressure applied thereat defines a seal as the web is passed between the tangent points thereof.

Disposed downstream of the respective top sealing means 59 is a cutting device 61. As shown, the cutting device comprises a plate element 62 disposed on one side of the connected packets 55 and a rotating wheel 63, the latter being provided with a series of radially projecting cutters 64. As shown, the respective cutters 64 are spaced so that upon rotation of the cutting wheel, one of the cutters will engage the web 31A along the line intermediate the width of the laterally spaced seams 54 to sever the endmost packet 55A from the line of connected packets 55 as the cutter 64 is forced against the plate 62 upon rotation of the cutting wheel 63.

Immediately adjacent the cutting means, there is disposed a pair of counter-rotating slipping clutch rollers 65, 65, one disposed on either side of the line of packets. The slipping clutch rollers 65, 65 are arranged so as to rotate at the speed which is greater than that at which the line of packets 55 is moving. Thus, as the end-most packet 55A is grasped between the slipping clutch rollers, 65, 65, as the packet 55A is fed thereto, the clutch rollers will slip as the packet 55A remains connected to the line of packets 55. As the end packet 55A disposed between clutch rollers 65 is severed from its line of connected packets, the clutch rollers cease their slipping whereupon the rapidly rotating clutch rollers 65 will eject the severed packet away from the end of the frame.

The severed packets are thus ejected to a chute 66 where they are collected.

Figure 6:
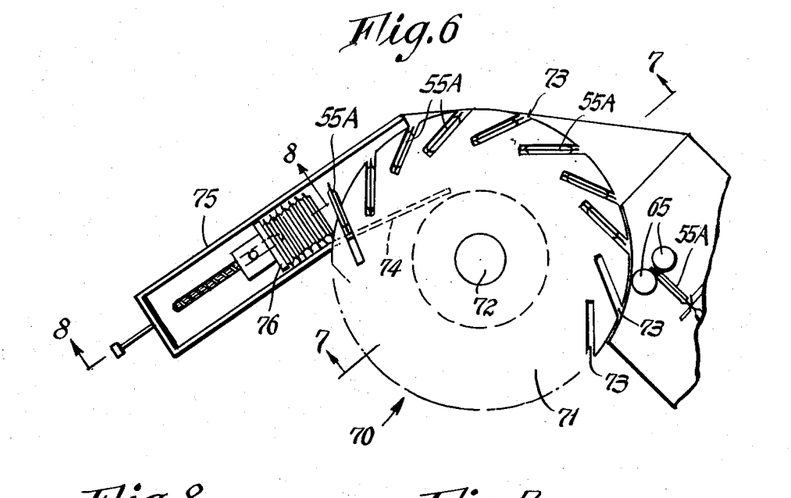
FIGURE 6 is a plan view of the stacking means and counting means adapted for use on the apparatus of FIG. 1 of the instant invention.
Figure 7:
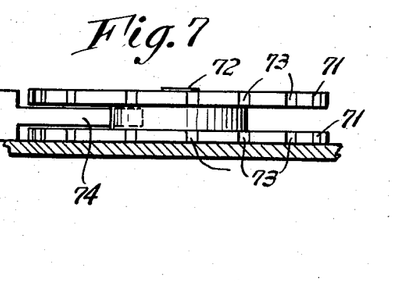
FIGURE 7 is a sectional view taken along line 7—7 of FIG. 6.
Figure 8:
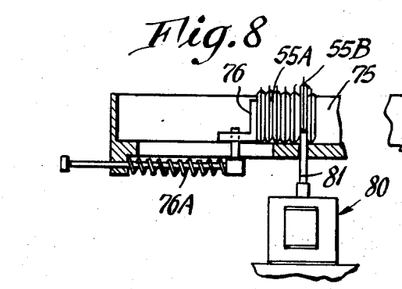
FIGURE 8 is a sectional view taken along line 8—8 on FIG. 6.
Figure 9:
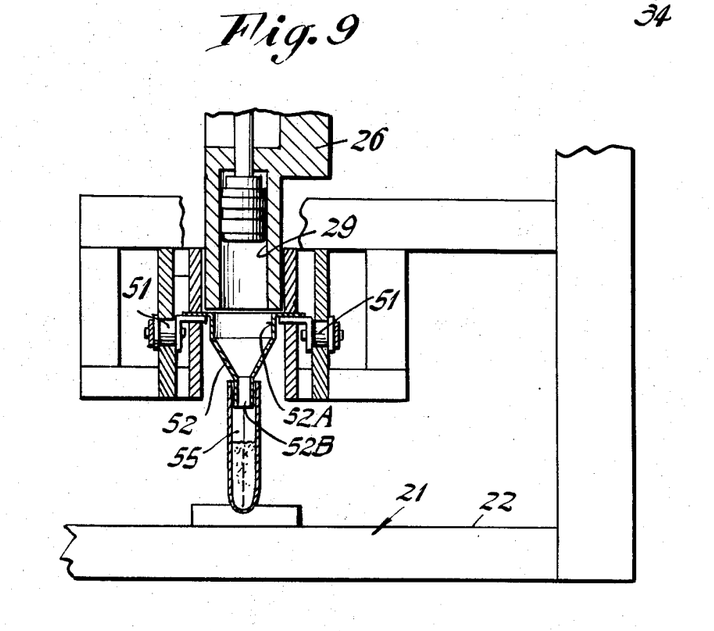
FIGURE 9 is a sectional view taken along line 9—9 on FIG. 2.

If desired, a collecting means 70 may be provided adjacent the cutter means 61 for receiving and orderly collecting the severed packets 55A as they are received. As shown in FIGS. 6 to 8, the collecting means 70 comprises a pair of horizontally spaced discs 71, 71 which are fixedly connected about a spindle 72. Each disc is provided with a plurality of alined angularly disposed slots 73 circumferentially spaced therearound. The discs 71, 71 are disposed relative to the cutting station 61 of the machine so that the packets 55A, as they are successively severed, are fed into one of the slots 73 of the discs 71 upon the rotation of the same in synchronization with the cutting wheel 63. A finger 74 extending in the space between discs 71, 71 successively ejects the packets 55A from the respective slots 73 as the latter approach the finger. In doing so, the packets 55A are discharged from the respective slots 73 of the collecting wheel and stacked in a rack 75 disposed adjacent the collecting wheel. A spring loaded plunger 76 defines one end of the rack 75. Thus, as each packet 55A is ejected from the respective slots of discs 71, 71 and are fed onto the rack, the accumulation of packets 55A within the rack causes the plunger to be urged against the bias of its spring 76A.

If desired, a counting means 80 may be cooperatively associated with the stacking rack 75 to provide at a glance the number of packets 55A disposed in the rack. This is attained by providing a solenoid ejector 81 which is set to lift a given packet 55B slightly higher than the others at regular intervals, as for example, say every fifth packet. Thus, by viewing the raised number of packets 55B and by multiplying the same by the interval constant, that is 5, an operator may, at a glance, know the count of the packets in the rack.

Figures 5, 11, 16:
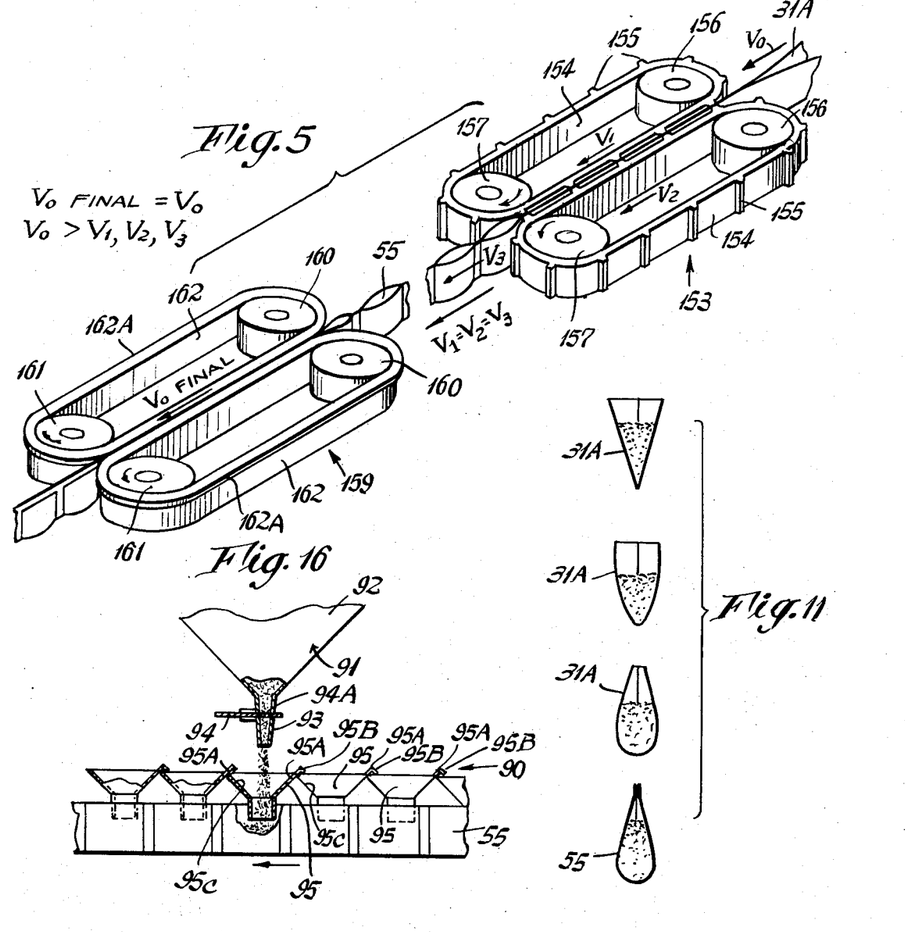
FIGURE 5 is a perspective view of a modified means for effecting the forming and sealing of the individual packets.
FIGURE 11 is a diagrammatical view illustrating the lay of the fluent material in the various stages of the packet formation.
FIGURE 16 is a detail showing of a modified filling station.

FIG. 5 illustrates a modified means for effecting the formation and sealing of the respective packets. In this form of the invention, the side sealing means 153 comprises an endless band 154 which is driven about a pair of spaced pulley means 156, 157. One such pair of pulley means and cooperating band is disposed on each side of the folded web 31A. Spaced along the respective bands 154 are a series of vertically disposed sealing or pressure applying projections 155. The arrangement is such that the sealing projections 155 along the inner flight of the respective bands are brought into simultaneous engagement at spaced transverse intervals along reverse folds of the web, and thereby exert a sealing pressure thereat. The arrangement is such that the endless belts 154 of side sealing mechanism 153 are synchronized to movement of the advancing web. In this manner, the cooperating sealing projections 155 may be maintained in engagement with the folds of the web for a longer period of time if such is necessary to form the side seals than the seal means 53 hereinbefore described.

A somewhat similarly modified top sealing mechanism 159 is provided in the event that it is necessary to maintain the pressure for an extended period along the top of the successive packets to form the closing seal. As shown in FIG. 5, the top sealing means 159 comprise a pair of pulleys 160, 161 disposed on either side of the line of packets. Connected about each pair of the respective pulleys 160, 161 is a band 162. Accordingly the top of the band is provided with an endless projection 162A for exerting a pressure along the tops of the several packets disposed therebetween. The arrangement is such that the band 162 of the top sealing means is also synchronized to travel at the same linear speed of the packets so that the relative speed between the band 162 and that of the packets is zero.

If desired the apparatus of FIG. 1 may be provided with means to assist the settling of the fluent material within the packets 55 formed about the discharge ends of the funnels 52. As best seen in FIGS. 1 and 4, the settling means comprises a pair of padle type wheels 85 disposed on either side of the moving line of packets 55. The paddle wheels 85 are disposed down stream from the filling station 24, and they are arranged so that the radially extending paddles 85A engage the sides of the packet to paddle the same; the paddle wheels 85 being rotated by any suitable drive connection or means (not shown). Accordingly, as the respective paddle wheels 85 are rotated, the paddle 85A will paddle the sides of the respective packets 55 moving therebetween to settle and compact the material discharging thereinto. FIGURE 11 illustrates the lay of the material in the packet 55 during the various stages of the packet filling operation. By locating the settling paddle wheels 85 immediately preceding the final sealing means 59, settling of the powdered material within the individual packets is completed before sealing. Consequently, a more positive closing seal may be formed because the marginal portion of the folded web in the vicinity of the top seal is then substantially free of any powdered material.

FIGURE 16 illustrates a slightly modified apparatus construction. In this form of the invention, the construction of the funnel conveyor 90 has been modified to accommodate the same for a continuous free flow type of supply or filling station 91. As shown in FIG. 16, the filling station 91 comprises a hopper 92 for containing a supply of fluent material in which the discharge end thereof funnels down into a discharge spout 93 that is valved by a sliding gate 94 or the like. The gate 94 has an aperture 94A, which when aligned with the spout 92, permits the material therein to flow in a continuous stream until the hopper 92 is emptied.

Accordingly, with a hopper supply of this type, the succeeding funnels 95 are constructed so as to have overlapping portions to insure against loss of any material therebetween. As shown, the trailing end 95A of the respective funnels is provided with a lip 95B which extends above and overlaps the leading edge 95C of the next succeeding funnel 95.

The line of funnels so described can thus be readily moved through the continuously flowing stream of fluent material discharging from the open spout 93 without losing any of the same. By acurately controlling the linear speed of the moving line of funnels 95 relative to the flow of material from the discharge spout 93 of the hopper, the amount of material emptying into each of the respective funnels and associated packet can be accurately maintained.

Figure 17:
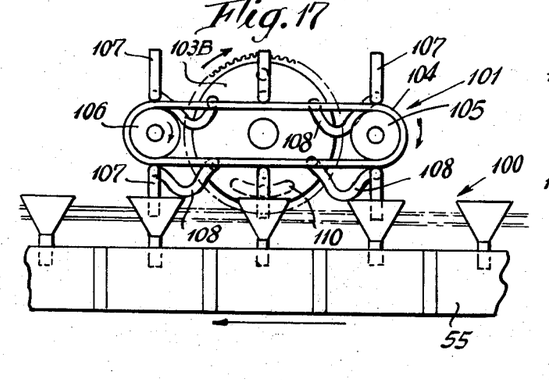
FIGURE 17 illustrates a front elevation view of a modified apparatus adapted for placing a predetermined amount of liquid in a packet in accordance with this invention.
Figure 18:
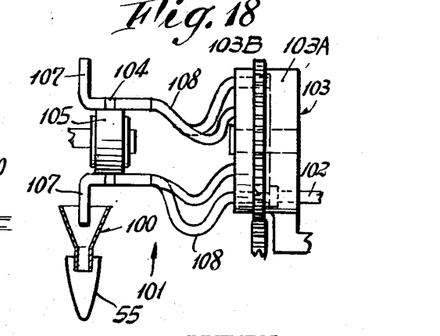
FIGURE 18 is a side view of FIG. 17.

FIGURES 17 and 18 illustrate an apparatus modification which renders the same applicable for use with a liquid material. In this form of the invention, the funnelling conveyor 100 is similar in construction to that hereinbefore described with reference to FIGS. 1, 2 or 15. The folding of the web and the forming of the packets 55 about the moving line of funnels 100 is likewise similar as hereinbefore described. However, in this form of the invention, the filling station 101 has to be modified so as to provide for the dispensing of measured amounts of liquid into each of the funnels 100 and associated packets 55.

As best seen in FIGURES 17 and 18, the liquid filling station comprises supply of liquid material (not shown) which is connected by a suitable conduit 102 to a liquid distributing means 103. The distributing means comprises a stationary manifold portion 103A and a cooperating rotary valve plate 103B. Operatively associated with valve plate 103B is an endless conveyor 104 which is threaded and driven over end pulleys or sprockets 105, 106. A plurality of nozzles 107 are spaced along the flights of conveyor 104. Each of the respective nozzles 107 in turn is connected to the valve plate 103B by a flexible hose coupling 108. In accordance with this invention, the valve plate 103B and the nozzle conveyor 104 are arranged to be driven in unison. The speed of the nozzle conveyor 104 in turn is timed to the speed of the funnel means 100 and packets 55 formd thereon. Accordingly, in operation the nozzles 107 travelling on the lower flight of their conveyor means 104 are arranged to align with respective succeeding funnel means 100 moving through the discharge point of the filling station 101. The manifold 103A and cooperating valve plate 103B are so constructed that a measured amount of liquid is discharged only when the hose connection 108 of a given nozzle 107 has been rotated to a predetermined position; as indicated at 110 in FIG. 17. In any other angular position of the respective nozzle hose connection, the flow of liquid to the nozzle 107 is cut off. Thus as the hose connection 108 of each nozzle is rotated past port opening 110, fluid is directed to the associated nozzle and emptied into the packet associated therewith.

Figure 19:
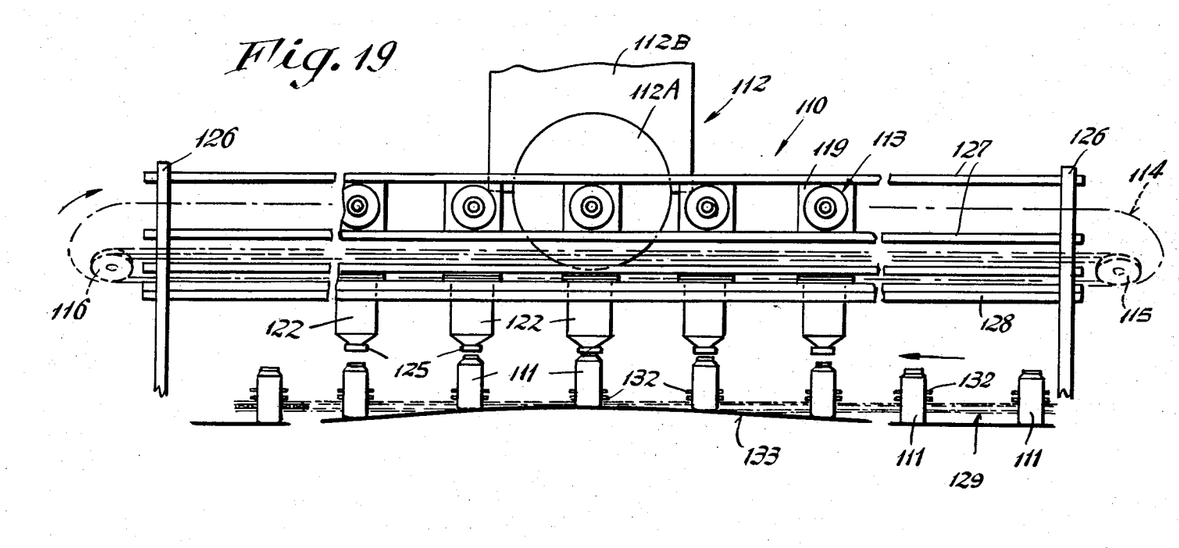
FIGURE 19 is a front elevation view of another modified form of the invention.
Figure 20:
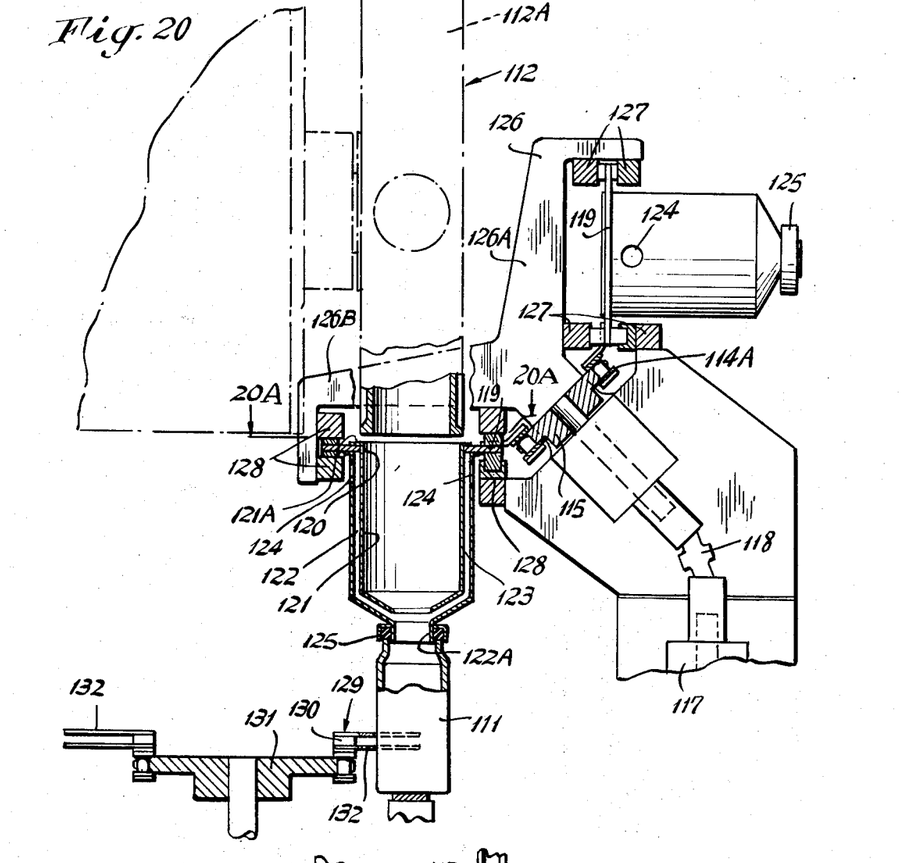
FIGURE 20 is an enlarged vertical detail view of the funnelling means of FIG. 19 shown in section.
Figure 20A:
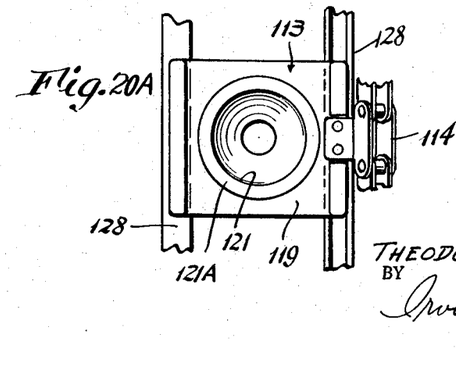
FIGURE 20A is a detail plan view of the funnel means taken along line 20A—20A on FIG. 20.

FIGURES 19, 20 and 20A illustrate an embodiment of an apparatus 110 in which the inventive concept is applied to the filling of preformed containers, such as jars, cans, bottles 111 and the like with a fluent material in a continuous and uninterrupted manner. In this form of the invention, the filling station 112 is similar to that described with respect to FIGS. 1 to 4. It comprises a rotating turret filling head 112A and an associated hopper 112B. However, in this form of the invention, the funnel means 113 and conveyor 114 therefor have been modified for adapting the apparatus to filling a jar or the like with a fluent material.

As seen in FIGS. 19 and 20, the funnel conveyor 114 comprises an endless chain threaded about a pair of inclined opposed sprockets 115, 116 which are driven by any suitable type drive 117. As best seen in FIG. 20, the respective sprockets 115, 116 are inclined at a 45° angle and are driven through a suitable universal coupling 118.

Accordingly the incline of the respective sprocket 115, 116 enables the upper flight 114A of the chain 114 threaded thereon to pass in front of the hopper 112B, and thereby minimize the overall travel height of the funnels 113.

In this form of the invention a modified funnel construction is provided. As best seen in FIG. 20 and 20A, a plurality of funnel supporting brackets 119 are connected at spaced intervals along the flights of the chain 114. Each bracket 119 is provided with a central opening 120. Connected to each bracket 119 about the respective openings 120 are a pair of concentrically spaced funnels 121, 122. As best seen in FIG. 20, the inner funnel 121 is inserted through the opening 120 of the bracket, with a flange 121A holding the same in position. The outer funnel 122, concentrically disposed thereto, is secured to the under side of the bracket 119. In accordance with this invention the inner and outer funnels are spaced to define therebetween an air evacuating space 123. As shown, the space 123 between funnels is open to the atmosphere by holes 124 formed in the outer funnel 122.

As best seen in FIG. 20, the outer funnel 122 has its discharge opening 122A circumscribed by a sealing ring 125 against which the mouth or opening of the jar 111 to be filled is pressed to define a fluid tight seal therebetween.

Means are provided for guiding the brackets 119 of the respective funnel means. As best seen in FIGS. 19 and 20, a pair of yokes 126 are connected between the ends of the machine frame. Each yoke 126 is provided with a vertical leg 126A portion and a horizontally disposed leg portion 126B. Connected between the respective leg portions 126A, 126B are spaced guide means 127, 128 for guiding the funnel brackets 119 along the respective flights of the conveyor chain as the latter is moved. The arrangement is such that the brackets 119 and the funnels connected along the lower flight of the conveyor 114 are guided along a horizontal path by guides 128 and the bracket 119 and funnels connected thereto along the upper flight are guided along guides 127 disposed 90° out of phase. See FIGS. 19 and 20.

In accordance with this form of the invention, means are provided for moving a line of jars 111 or the like successively through the filling station 112 in unison with the moving funnels 113 therethrough. The jar conveyor 129 comprises an endless chain or belt 130 threaded about opposed pulleys or sprockets 131 rotatably journalled on the table of the machine. As shown in FIGS. 19 and 20, the conveyor or chain 130 is provided with laterally extending fingers 132 to define the jar carriers. The arrangement is such that the respective jar carriers 132 embraces the sides of the jar 111 and carry the same along therewith, as the jar conveyor 129 is activated. Associated with the jar conveyor is a cam surface 133 arranged to progressively raise the jars 111 toward their associated funnels 113 moving in unison therewith. The slope of the cam surface 133 is such that the mouth of the jars 111 are sealed against the sealing ring 125 of the associated funnel means prior to the passing of the same through the discharge position of the turret filling head 112A.

In this form of the invention, the speed of the funnel means and associated jars with respect to the rotating turret head is similar to that hereinbefore described so that a continuous and uninterrupted filling operation is attained for maximum production.

As seen in FIG. 19, the funnels and associated jars are moved through and beyond the filling station and the respective jars are progressively lowered to free the mouth therefrom from the funnel, separation occurring only after all of the material in the funnel has passed therethrough.

To enhance the flow of material from the tunnel means 113 to the jar 111 associated therewith, a means (not shown) is provided to vibrate or shake the funnels. Compacting of the material within the jar is assured by the spacing 123 between respective inner and outer funnels whereby the air displaced by the material flowing into the respective jars 111 is evacuated up through the space 123 between funnels and exhausts the same to atmosphere through holes 124 in the outer funnel. Suitable collecting means (not shown) collect the filled jars where they are subsequently directed to a suitable capping apparatus.

While the instant invention has been shown and described with respect to several embodiments thereof, it will be readily understood and appreciated that variations and modifications may be made without departing from the spirit or scope of the invention.

What is claimed is:

1. A method of continuously forming and filling a packet with a predetermined measured amount of flowable material comprising the steps of,
   continuously folding a strip of material about a longitudinally extending fold line to define a web having reversed folds,
   positioning the discharge ends of a moving line of funnels between the folds of said web,
   forming said web into a plurality of connected packets by seaming the reversed folds of said web together at transversely spaced intervals between the adjacent discharge ends of said moving line of funnels,
   successively charging each of said moving funnels and the connected packet associated therewith with a predetermined charge of said material,
   successively moving the respective funnels from their respective packets of said moving line of packets after the flowable material has passed therethrough and settled in said packet,
   successively sealing the open ends of said connected packets to confine the flowable material therein by forming a continuous seal extending along the edges of the reverse folds of said web of material opposite said fold line, and
   severing the endmost packet from the continuous moving line of packets after said packets have been sealed and collecting said severed packets.

2. A method of continuously filling a container with a quantity of flowable material comprising the steps of
   (a) continuously moving a line of detached containers toward a filling station,
   (b) continuously moving a line of funnelling means toward said station in unison with said moving line of detached containers, moving said containers into sealing position with the discharge ends of the respective funnelling means whereby the discharge ends of the respective funnels are disposed in communication with the interior of the respective containers moving therewith,
   (c) charging each of said funnelling means disposed in communication with said containers as the same are moved through said filling station, exhausting the displaced air from the containers as the flow of material empties into said container free of interference with the material flowing thereinto,
   (d) and removing said funnelling means out of communication with said respective detached container after the flowable material has passed therethrough.

3. A method continuously forming and charging a packet with a flowable material comprising the steps of,
   (a) continuously folding an elongated strip of material along a longitudinal foldline to define a folded web having reverse folds and advancing said fold toward a filling station at a predetermined velocity,
   (b) disposing a series of moving spaced apart funnelling means between the reverse folds of said web and advancing said funnelling means toward said filling station at a velocity slightly less than that of the web,
   (c) absorbing the differential velocity between that of the web and funnel means by puckering the bottom of the web,
   (d) successively sealing the opposed folds of said web at transversely spaced intervals between adjacent funnelling means to define a series of connected packets which are closed on three sides thereof whereby the funnel means and packet formed thereon are advanced at substantially the same velocity through a filling station,
   (e) successively charging each of said funnelling means as they reach the filling station without interruption in the movement of said funnelling means through said station,
   (f) successively removing the funnelling means from the respective pouches as the flowable material has passed therethrough to the individual packets.

4. An apparatus for continuously forming and charging a packet with predetermined amounts of flowable material comprising,
   (a) a folding station for continuously folding an elongated strip of material along a longitudinal foldline to define a web having reverse folds,
   (b) a filling station including a hopper for containing a supply of flowable material,
   (c) an endless conveyor means having spaced flights of connected funnel means,
   (d) said conveyor being disposed so that the funnel means of one of said flights are disposed between the folds of said web, said one flight of funnel means extending from a point downstream of said folding means, through said filling station and to a point downstream of said filling station whereby the direction of said one flight is changed to effect removal of the funnel means from the packets,
   (e) means interposed between said folding station and said filling station for joining the opposed folds of said web at spaced interval about said funnel means to define a series of connected packets formed directly about the discharge ends of said funnel means in said one flight whereby said funnel means and associated packets are moved through said filling station, (f) a rotating filling head turret having a plurality of filling chambers circumferentially spaced thereon, (g) means for rotating said head so that said filling chambers are moved successively through a filling position and a discharging position whereby the angular velocity of said head is synchronized to the movement of the funnels moving thereunder so that the respective charges of said filling chamber are successively deposited into successive funnels moving thereunder, (h) means downstream of said conveyor means for sailing the open end of said connected packets to confine the flowable material therein.

5. An apparatus for continuously forming and charging a packet with equal predetermined amounts of flowable material comprising, (a) a folding station for folding an elongated strip of material along a longitudinal foldline to define a web having reverse folds, (b) a filling station for dispensing substantially equal predetermined charges of a flowable material, (c) an endless line of connected funnel means, (d) means for successively moving the discharge ends of said funnels between the folds of said web at a predetermined velocity, (e) means interposed between said folding station and said filling station for joining the opposed folds of said web at spaced intervals about the discharge ends of said funnel means whereby said packets are simultaneously moved toward said filling station at a velocity slightly greater than that of the moving funnel, and means for absorbing the difference in the velocity of said funnel means and said connected packets as the same move toward the filling station, (f) said filling station including a rotating filling head turret having a plurality of filling chambers circumferentially spaced thereon, means for rotating said head so that said filling chambers are moved successively through a filling position and a discharging position whereby the angular velocity of said head is synchronized to the movement of the funnels moving thereunder so that the respective charges of said filling chambers are successively deposited into the successive funnels moving thereunder, (g) means disposed beyond the filling station for effecting a change in the direction of said funnel means whereby the same are respectively removed from their associated packet, (h) means for sealing the open end of the packet.

6. An apparatus for continuously forming and filling packets with predetermined amounts of flowable material comprising, (a) a filling station, (b) means for supplying a continuous strip of material, (c) a folding station, (d) means for feeding said strip of material through said folding station at a predetermined linear speed whereby said strip is folded along a longitudinal foldline to define a reversely folded web, (e) an endless line of funnel means, (f) means for moving said endless line of funnel means between the folds of said web and through said filling station at a speed slightly less than that of the folded strip, and means for equalizing the speed of said folded strip and the funnel means as they advance toward the filling station, (g) means disposed adjacent to the reverse folds of said web for sealing said folds together along a transverse seam at spaced intervals between the adjacent funnel means in said line as said funnelling means and associated packet is advanced toward said filling station, (h) said filling station including a rotating filling head turret having a plurality of filling chambers circumferentially spaced thereon, means for rotating said head so that said filling chambers are moved successively through a filling position and a discharging position whereby the angular velocity of said head is synchronized to the movement of the funnels moving thereunder so that the respective charges of said filling chambers are successively deposited into successive funnels moving thereunder, said funnelling means being removed from its associated packet as said line of connected packets is moved beyond the end of said moving line of funnel means, (i) means for sealing the open ends of the respective connected packets to confine the flowable material therein upon removal of the funnel means therefrom, (j) and means for severing the endmost filled packets from said connected line of packets along the transverse seam at a point intermediate the width of said seams.

7. An apparatus for continuously forming and filling packets with predetermined amounts of a flowable material comprising (a) a filling station, (b) means for continuously folding a strip of material to define a web having reversely folded folds, (c) means for advancing said folded web toward said filling station at a predetermined velocity, (d) a plurality of funnels connected in an endless line, each of said funnels having a discharge end, (e) means for moving said funnels in an endless path whereby a series of said funnels have their discharged ends disposed between the folds of said web in advance of said filling station, (f) said latter moving means advancing said funnels toward said filling station at a velocity less than that of the web, (g) means for absorbing the difference in the relative velocities of said web and said funnels as they approach the filling station, (h) means for joining the folds of said web together about the discharge ends of the successive funnels disposed therebetween as the velocity of said web approaches that of the funnels in advancing toward the filling station, (i) said filling station including means dispensing a measured quantity of said material into each of said funnels passing therethrough, (j) means for effecting the removal of the respective funnels from the packet upon the flow of material thereinto, (k) and means for successively sealing the open end of said packets to confine the material therein.

8. The invention as defined in claim 7 wherein the endless moving line of funnels are inclined with respect to the moving line of packets so that the discharged ends thereof are progressively removed from the packet associated therewith as the funnel and associated packet are moved beyond the filling station.

9. The invention as defined in claim 7 wherein said velocity absorbing means includes (a) a rotating means adapted to push up the bottom of the reversely folded web as said web approached the fold joining means.

10. The invention as defined in claim 7 wherein said filling station includes (a) a stationary manifold having a chamber, (b) means connecting the chamber of said manifold to a source of liquid supply, (c) a rotary valve plate mounted on said manifold for valving said chamber, (d) a series of nozzles adapted to move in an endless path, (e) means connecting each of said nozzles to said valve plate whereby each of said nozzles are successively placed in communication with said manifold chamber as said valve plate rotates relative thereto, (f) and means for moving said line of nozzles in unison with the moving line of funnels through said filling station so that the nozzle connected in communication with said chambers dispenses its liquid charge into the funnel associated therewith.

11. The invention as defined in claim 7 and including
(a) means for settling the material in the respective packets prior to sealing the open end thereof.

12. The invention as defined in claim 11 wherein said settling means includes a paddle wheel disposed adjacent said moving line of packets to paddle the sides thereof.

13. The invention as defined in claim 7 wherein said means for joining the folds of said web include
(a) a pair of cooperating counter rotating rollers, one disposed on either side of said folded web,
(b) each of said rollers having projecting pressure bars formed on the periphery thereof whereby the projecting bars of said cooperating rollers exert a pressure on the folded web disposed therebetween to effect the sealed connection between adjacent packets.

14. The invention as defined in claim 7 wherein said means for joining the folds of said web include
(a) an endless band disposed on either side of said folded web,
(b) each of said bands having a plurality of spaced traversely extending pressure bearing projections formed thereon whereby the projections of said respective band cooperate to exert a sealing pressure on the folds of said web disposed therebetween,
(c) and means for effecting the drive of said band with respect to speed of said web advancing therebetween.

15. The invention as defined in claim 7 wherein the dispensing means of said filling station includes
(a) a rotating filling head turret having a plurality of filling chambers circumferentially spaced thereon,
(b) means for rotating said head so that said filling chambers are moved successively through a filling position and discharging position whereby the angular velocity of said head is synchronized to the movement of the funnels moving thereunder so that the respective charges of said filling chamber are successively deposited into the successive funnels moving thereunder.

16. The invention as defined in claim 7 wherein the dispensing means of said filling station includes
(a) a hopper having an open spout through which a steady stream of material stored therein is adapted to flow,
(b) means for valving said spout,
(c) and wherein the successive moving funnels have adjacent overlapping end portions.

17. An apparatus for continuously forming and charging a packet with a predetermined uniform quantity of flowable material comprising,
(a) an endless conveyor means having an upper flight and a lower flight,
(b) a plurality of funnelling means carried by said conveyor means, means for driving said conveyor and funnelling means carried thereby at a predetermined velocity,
(c) a filling station disposed intermediate the ends of said conveyor,
(d) said filling station including a hopper and a rotating turret provided with a series of measuring chambers adapted to rotate relative to said hopper between a filling and discharging position,
(e) said turret means being disposed between said flights and adjacent the inlet ends of said funnelling means carried by the lower flight of said conveyor means,
(f) means for feeding a continuous strip of material folded along a longitudinal foldline toward said filling station at a velocity slightly greater than the velocity of said funnelling means and means for absorbing the difference in the relative velocities between said funnelling means and said moving strip of material whereby the discharge ends of said moving funnelling means are disposed between the moving reverse folds of said strip,
(g) means disposed in advance of the filling station for sealing the folds of said reversely folded strip together at spaced intervals to define successively joined packets formed about the discharge end of associated funnelling means, whereby said formed connected packets and associated funnelling means are simultaneously advanced through said filling station,
(h) said turret means being timed to the movement of said packets and associated funnelling means so that the respective measuring chambers thereof deposit their respective charges in to the successive funnelling means moving through said filling station,
(i) said packets and associated funnelling means continuing beyond said filling station at which time the respective funnelling means are successively lifted out of the associated packet,
(j) means for closing the upper end of the respective packets of the connected line of packets,
(k) and means for successively severing the end most packet from the moving line of packets.

18. An apparatus for continuously forming a packet of foldable material and charging the same with uniform predetermined amounts of flowable material comprising,
(a) a frame having a top supporting surface and a connected back support disposed normal to said top supporting surface,
(b) a spool mounted on said frame for receiving a supply roll of foldable packet forming strip material,
(c) a folding station mounted on said top support for continuously folding said strip of material about a longitudinally extending foldline to define a web having a reverse fold,
(d) means for advancing said strip of material through said folding station at a given velocity,
(e) an endless conveyor mounted on the back support of said frame, said conveyor carrying a series of connected funnelling means,
(f) means for driving said conveyor in the same direction as the advancing strip of material, whereby the funnelling means carried thereby at a velocity slightly less than that of the moving web and successively moving funnelling means being disposed between the folds of said web, means for absorbing the difference in the relative velocities of said moving web and said funnelling means as they advance in unison,
(g) cooperating side sealing means disposed on either side of the folded web and funnelling means disposed therebetween for joining the opposed folds of said web at transversely spaced intervals therealong to define a series of connected packets having their respective open ends formed about the discharge ends of associated funnelling means,
(h) a filling station including a hopper and a rotatably journalled turret filling head,
(i) said filling head including a plurality of measuring chambers movable between filling and discharging position,
(j) means for synchronizing the rotation of said turret head so that the respective measuring chambers thereof discharge their respective contents of flowable material into the successive funnelling means as the latter pass said turret head said funnelling means being successively removed from their associated packets as the flowable material has passed therethrough,
(k) cooperating top sealing means disposed on either side of said connected line of packets to successively seal the open end thereof to confine the flowable material therein, (1) and means for successively severing the end sealed packet from the line of connected packets.

19. An apparatus for filling containers with a measured amount of fluent material comprising, (a) a filling station including a hopper and an associated rotating filling head turret, (b) a plurality of connected funnel means adapted to travel in an endless path, (c) means for conveying a plurality of rigid detached containers successively toward said filling station, (d) means for successively moving said containers into sealing relationship with said moving funnel means, (e) each of said funnel means having means for enhancing the compacting of said fluent material in said container, (f) said latter means including an air evacuation chamber for exhausting the displaced air from said container as the material flows thereinto.

20. An apparatus for successively filling containers with a measured predetermined amount of powdered material comprising, (a) a filling station including a hopper and an associated turret filling head, said head having a series of measuring chambers arranged to rotate between a filling position and discharging position, (b) a funnel conveyor having a plurality of connected funnel means arranged to travel in an endless path past the discharging position of said turret head, (c) each of said funnels means including an inner and outer funnel nested in spaced relationship, (d) sealing ring disposed about the discharge end of said outer funnel, and said outer funnel having an opening formed in a wall portion thereof, (e) means for conveying a series of detached containers successively in line to said filling station, (f) means for moving said container into sealing relationship with the respective sealing ring of said funnel means to define a fluid tight seal therebetween, (g) means for effecting vibration of said funnel means to enhance the flow of material as said funnel means and container sealer thereto are moved through the filling station, and whereby the air displaced by the material flowing therethrough is evacuated through the spacing defined between said inner and outer funnel.

21. The invention as defined in claim 20 including means for guiding said funnel conveyor in front of said hopper.

References Cited

UNITED STATES PATENTS

| | | | |
|---|---|---|---|
| 3,082,585 | 3/1963 | Waters | 53—180 |
| 1,091,251 | 2/1942 | Robinson | 53—29 |
| 2,330,361 | 9/1943 | Howard | 53—180 X |
| 2,360,510 | 10/1944 | Murray | 53—183 X |
| 2,654,195 | 10/1953 | Irmscher | 53—29 |
| 2,721,017 | 10/1955 | Hiscock | 53—29 X |
| 2,913,862 | 11/1959 | Sabee | 53—180 X |
| 2,923,111 | 2/1960 | Selock | 53—29 |
| 3,040,490 | 6/1962 | Virta | 53—180 X |
| 3,192,684 | 7/1965 | Iannucci | 53—180 |

WILLIAM W. DYER, JR., *Primary Examiner.*

GRANVILLE Y. CUSTER, *Examiner.*